US008869498B1

(12) United States Patent
Bremmer

(10) Patent No.: US 8,869,498 B1
(45) Date of Patent: Oct. 28, 2014

(54) HANDHELD HARVESTER APPARATUS

(71) Applicant: Martin Bremmer, Venango, NE (US)

(72) Inventor: Martin Bremmer, Venango, NE (US)

(*) Notice: Subject to any disclaimer, the term of this patent is extended or adjusted under 35 U.S.C. 154(b) by 0 days.

(21) Appl. No.: 14/245,982

(22) Filed: Apr. 4, 2014

(51) Int. Cl.
*A01D 41/08* (2006.01)
*A01D 45/00* (2006.01)
*A01F 12/60* (2006.01)
*A01F 7/02* (2006.01)
*A01F 12/44* (2006.01)
*A01F 5/00* (2006.01)

(52) U.S. Cl.
CPC . *A01F 5/00* (2013.01); *A01F 12/60* (2013.01); *A01F 7/02* (2013.01); *A01F 12/446* (2013.01)
USPC .............................................. 56/126; 460/78

(58) Field of Classification Search
CPC .............. A01D 41/127; A01D 4/1276; A01D 41/1277; A01D 41/00; A01D 89/002; A01D 45/30; Y10S 460/902; A01F 7/06; A01F 12/22; A01F 12/18; A01F 12/442; A01F 12/446
USPC ............. 56/126, 128, 130, 13.5; 460/101, 78, 460/122
See application file for complete search history.

(56) References Cited

U.S. PATENT DOCUMENTS

| 315,710 | A | | 4/1885 | Bruce | |
|---|---|---|---|---|---|
| 1,662,736 | A | * | 3/1928 | Browning | 56/123 |
| 2,169,527 | A | * | 8/1939 | Haynes | 56/126 |
| 2,236,002 | A | | 3/1941 | Lederer | |
| 2,245,081 | A | * | 6/1941 | Pierce | 56/122 |
| 2,499,047 | A | * | 2/1950 | Wilkins | 56/13.5 |
| 2,760,492 | A | | 8/1956 | Allen | |
| 2,853,845 | A | * | 9/1958 | Smith | 56/128 |
| 3,124,139 | A | * | 3/1964 | Stokland | 460/75 |
| 3,423,910 | A | * | 1/1969 | Takatsugu et al. | 56/13.3 |
| 3,425,423 | A | * | 2/1969 | McKenzie | 460/82 |
| 4,313,449 | A | * | 2/1982 | Da Silva | 460/66 |
| 4,417,593 | A | | 11/1983 | Brehon | |

(Continued)

FOREIGN PATENT DOCUMENTS

| EP | 0316969 B1 | 11/1994 |
|---|---|---|
| WO | 2000008915 A1 | 1/2002 |
| WO | 2005112605 A1 | 12/2005 |

OTHER PUBLICATIONS

Gode, The minibatt—taking sample cereal—combine harvester, Printed online: http://www.gode.fr/uk/default.asp?rub=2&srub=18& ssrub=33&langue=uk#, Print Date Feb. 10, 2014, 2 pages.

*Primary Examiner* — Árpád Fábián-Kovács
(74) *Attorney, Agent, or Firm* — Suiter Swantz pc llo

(57) ABSTRACT

The present disclosure is a handheld harvester apparatus including a threshing drum configured to rotate. The harvester may further include a plurality of teeth connected to the threshing drum and configured to strip seeds from a head of a plant. The harvester also includes a screening assembly coupled to the threshing drum. The screening assembly is configured to receive seeds and plant material from the threshing drum and to eject the plant material from the harvester and direct the seeds downward. The harvester further includes a first screen configured to receive the seeds from the screening assembly and to allow seeds sized below a predetermined threshold to pass through the first screen and to prevent plant material exceeding the predetermined threshold to pass through the first screen. The harvester may further include a collection chamber coupled to the first screen and configured to receive the seeds.

10 Claims, 9 Drawing Sheets

(56) References Cited

U.S. PATENT DOCUMENTS

| | | | | |
|---|---|---|---|---|
| 4,458,697 A | * | 7/1984 | James | 460/74 |
| 4,578,934 A | * | 4/1986 | West et al. | 56/12.9 |
| 4,738,087 A | * | 4/1988 | Lundahl | 56/130 |
| 4,951,453 A | * | 8/1990 | Klinner | 56/364 |
| 5,036,653 A | | 8/1991 | Klinner | |
| 5,041,058 A | | 8/1991 | Quimby | |
| 5,106,340 A | | 4/1992 | Quimby | |
| 5,287,685 A | * | 2/1994 | Morgan | 56/126 |
| 5,389,038 A | | 2/1995 | Shelbourne et al. | |
| 5,419,107 A | * | 5/1995 | Shelbourne et al. | 56/130 |
| 5,569,079 A | | 10/1996 | Ryden et al. | |
| 5,678,397 A | | 10/1997 | Shelbourne et al. | |
| 5,851,145 A | | 12/1998 | Lohse | |
| 5,878,970 A | | 3/1999 | Leeb | |
| 6,315,659 B1 | | 11/2001 | Shelbourne | |
| 6,361,435 B1 | | 3/2002 | Yamamoto et al. | |
| 6,640,530 B1 | * | 11/2003 | Arbuckle | 56/130 |
| 7,524,242 B2 | * | 4/2009 | Stukenholtz et al. | 460/115 |
| 7,681,383 B2 | * | 3/2010 | Argetsinger et al. | 56/14.6 |
| 2006/0046801 A1 | * | 3/2006 | Argetsinger et al. | 460/59 |

* cited by examiner

HANDHELD HARVESTER APPARATUS

TECHNICAL FIELD

The present disclosure generally relates to the field of agricultural devices and more particularly to a handheld harvester.

BACKGROUND

When growing grain and seed crops, it is important to determine moisture levels of the grain and seed crop in order to assess crop health and optimize the timing of harvesting. Current systems and methods for determining a moisture level of grain and seed crops occupying a large area may require taking several samples within a large field in order to obtain an accurate picture of the moisture levels of the entire field. For each sample, a farmer may be required to travel to a different location within the field while transporting heavy equipment and machinery. For instance, a farmer may have to use a combine to take samples in several different locations in the field. The use of such large equipment to take several small samples may be inefficient.

Similarly, growers of smaller crops that do not occupy a large area need to harvest their crops in a manner suitable for a smaller operation. For smaller crops, it may not be economical or practical to use large and complex agricultural machinery to handle a smaller scale harvest.

Therefore, there exists a need for improved systems and methods for obtaining samples of crops encompassing a large area, as well as for harvesting smaller scale crops.

SUMMARY

The present disclosure is directed to a harvester. The harvester may include a threshing drum configured to rotate. The harvester may further include a plurality of teeth connected to the threshing drum and configured to strip seeds from a head of a plant. The harvester may also include a screening assembly coupled to the threshing drum. The screening assembly may be configured to receive seeds and plant material from the threshing drum and to eject the plant material from the harvester and to direct the seeds downward. The screening assembly may include an axle and a plurality of paddles coupled to the axle. The harvester may further include a first screen in communication with the screening assembly. The first screen may be configured to receive the seeds from the screening assembly and to allow seeds sized below a predetermined threshold to pass through the first screen and to prevent plant material exceeding the predetermined threshold to pass through the first screen. The harvester may further include a collection chamber coupled to the first screen, the collection chamber configured to receive the seeds.

The present disclosure is further directed to the method of harvesting. The method may include the step of at least partially stripping one or more seeds and plant material from a head of a plant. The method may further include the step of channeling the seeds and plant material into a screening assembly. The method may also include the step of ejecting the plant material from the screening assembly. An additional step of the method may include passing the seeds and an unejected plant material over a screen, the screen configured to allow seeds sized below a predetermined threshold to pass through the screen, the screen further configured to prevent the unejected plant material from passing through the screen. The method may further include the step of collecting the seeds in a chamber.

The present disclosure is further directed to a handheld harvester. The handheld harvester may include a threshing drum configured to rotate. The handheld harvester may also include a plurality of teeth connected to the threshing drum and configured to at least partially surround a head of a plant before stripping one or more seeds from the head of the plant. The handheld harvester may also include a screening assembly coupled to the threshing drum. The screening assembly may include an axle and a plurality of paddles coupled to the axle. The screening assembly may be configured to receive seeds and plant material from the threshing drum, and to eject the plant material from the harvester and direct the seeds downward. The handheld harvester may further include a plurality of screens in communication with the screening assembly. The plurality of screens may be configured to receive the seeds from the screening assembly and to allow seeds sized below a predetermined threshold to pass through the plurality of screens and to prevent plant material exceeding the predetermined threshold to pass through the plurality of screens. The handheld harvester may further include a collection chamber coupled to the plurality of screens and configured to receive the seeds. The collection chamber may further include a scale and a moisture meter to determine a weight and a moisture level of the seeds.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures in which.

DETAILED DESCRIPTION

Figure 1:
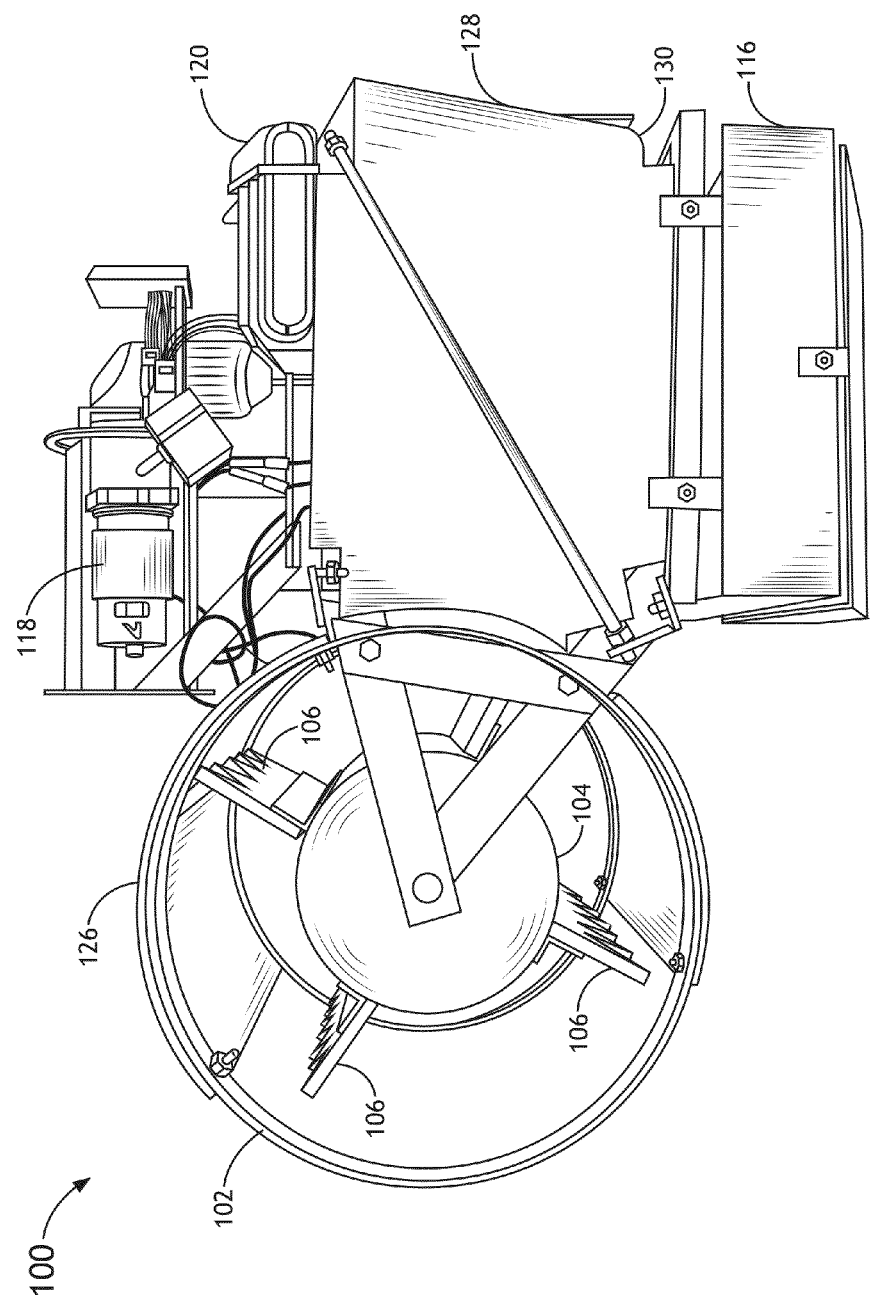
FIG. 1 shows a side view of a handheld harvester.
Figure 2:
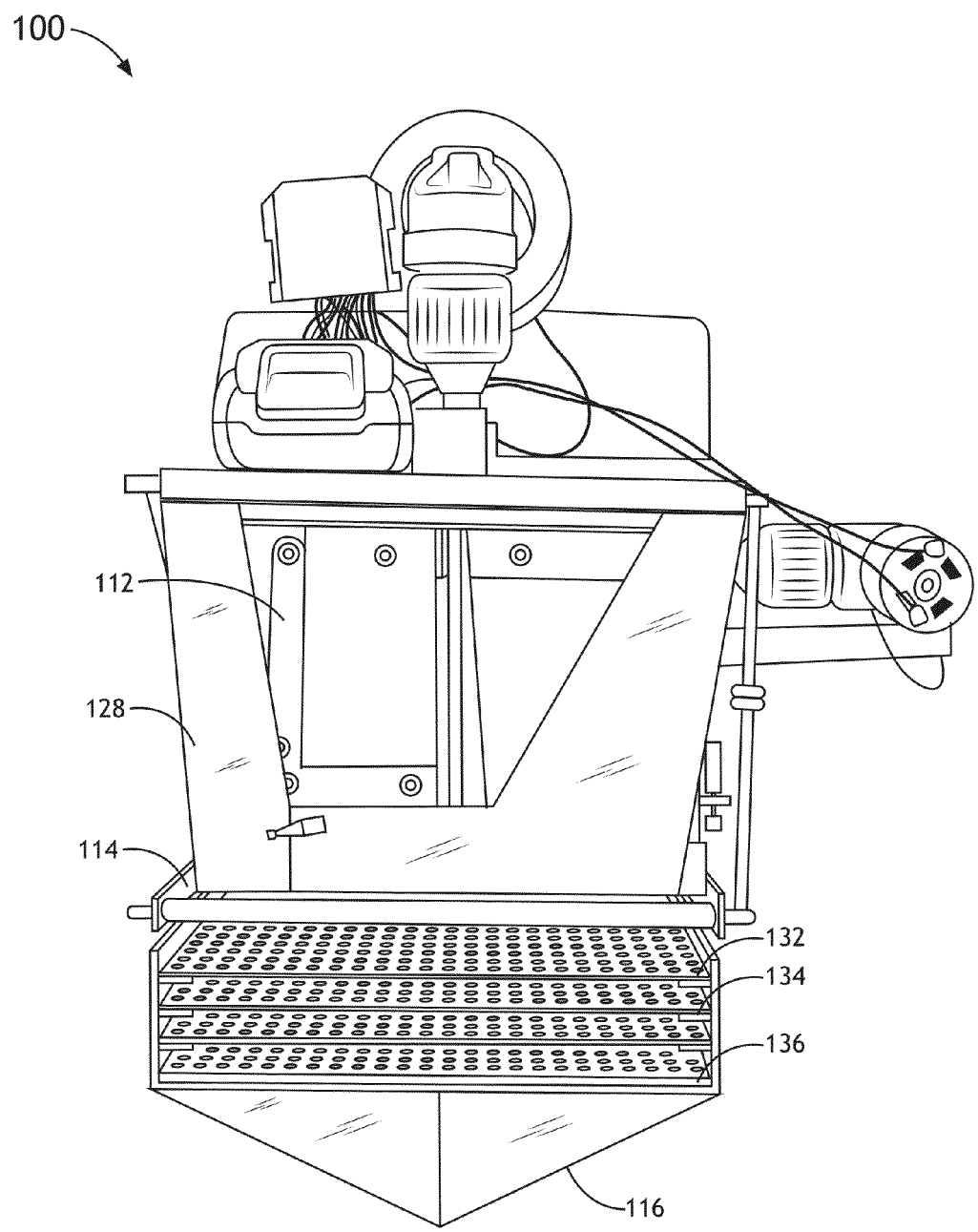
FIG. 2 is a rear view of a handheld harvester.
Figure 3:
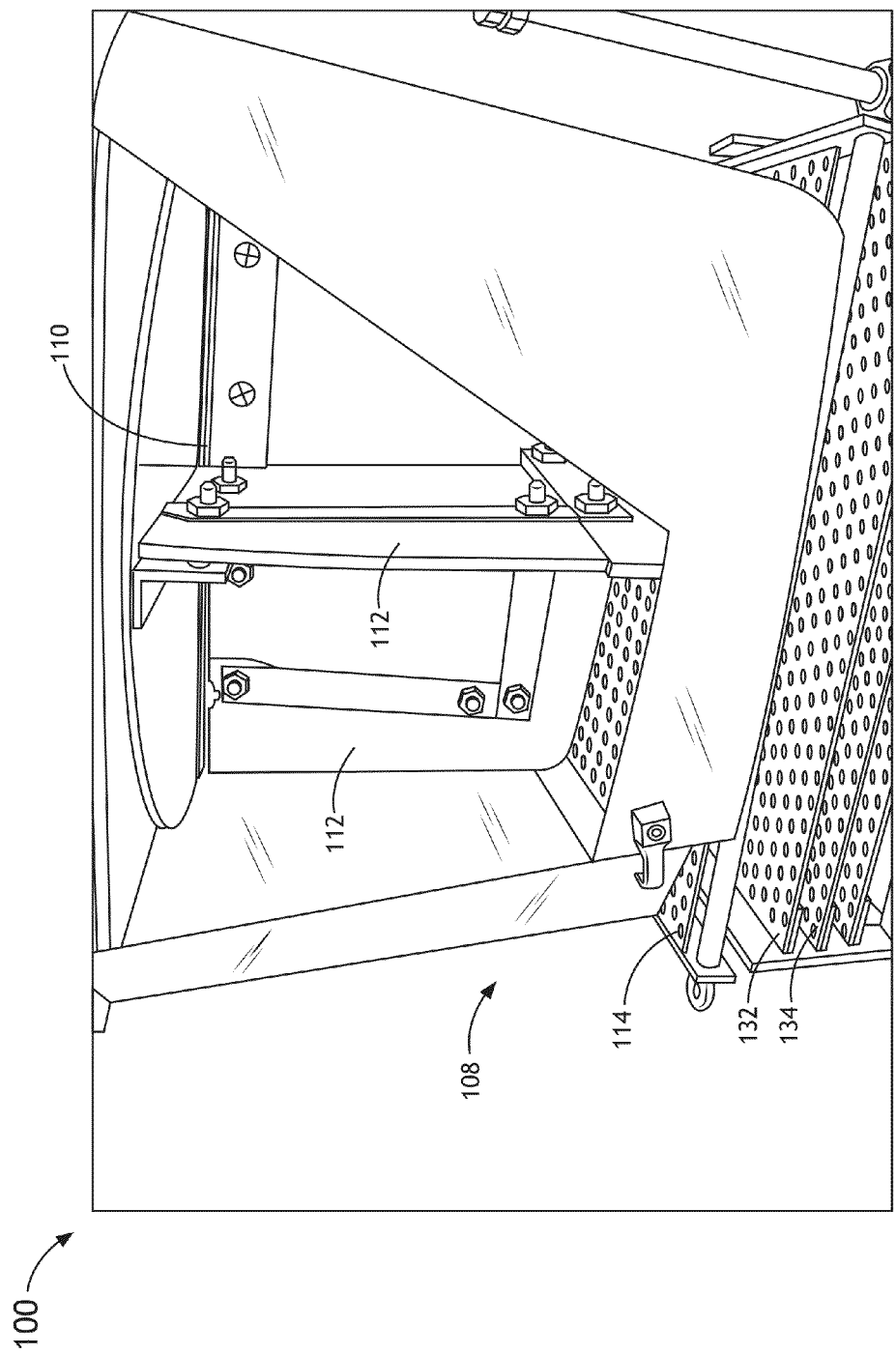
FIG. 3 is an illustration of a screening assembly of a handheld harvester.
Figure 4:
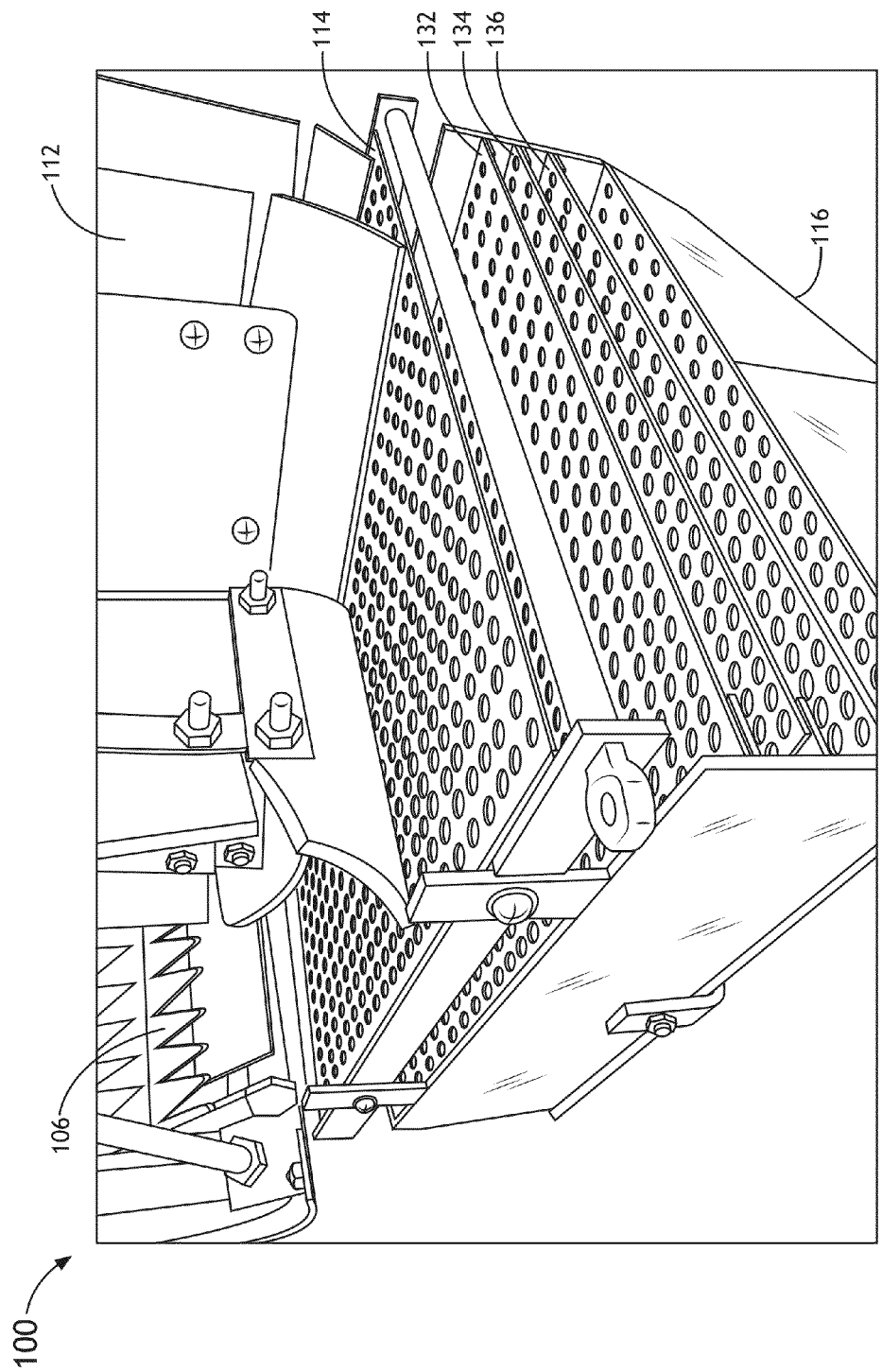
FIG. 4 is an illustration of a plurality of screens associated with a handheld harvester.

Referring generally to FIGS. 1-7, a harvester 100 is provided. The harvester may be used to harvest seeds in a field and may be suitable for handheld harvesting. The harvester 100 may include a threshing drum 102 that is configured to rotate. The threshing drum 102 may include an axle 104 and a plurality of teeth 106 connected to the axle 104. The plurality of teeth 106 may be configured to strip seeds from a head of a plant. The harvester 100 may further include a screening assembly 108 coupled to the threshing drum 102. The screening assembly 108 includes an axle 110 and a plurality of paddles 112 coupled to the axle 110. The screening assembly 108 is configured to receive seeds and plant material from the threshing drum 102 and to eject the plant material from the harvester 100 and to direct the seeds in a generally downward direction. The harvester 100 may also include a screen 114. The screen 114 is in communication with the screening assembly 108. The screen 114 is configured to receive the seeds from the screening assembly 108 and to allow seeds sized below a predetermined threshold to pass through the screen 114 and prevent plant material exceeding the predetermined threshold to pass through the screen 114. The harvester 100 also includes a collection chamber 116 coupled to the screen 114. The collection chamber 116 is configured to receive the seeds that passed through the screen 114. Using the harvester 100, it may be possible to obtain a clean seed sample for a variety of crops.

The threshing drum 102 is configured to rotate in one embodiment. The direction of rotation may be generally perpendicular to the head of the plant. The threshing drum 102 may be connected to an electric motor 118 powered by a battery 120 that is configured to control the speed of rotation of the threshing drum 102. For example, it may be desirable to provide different rotation speeds depending on the crop type as well as crop conditions or environmental conditions during harvesting.

A plurality of teeth 106 may be attached to the threshing drum 102. In one embodiment, the plurality of teeth are attached to an axle 104 of the threshing drum 102 and may be distributed in several different rows. The plurality of teeth 106 may be configured to strip seeds from a seed head of a plant. In one embodiment, the plurality of teeth 106 may be configured to strip the seeds from the head of the plant while leaving the plant and/or the head of the plant substantially intact. While the plurality of teeth 106 may strip some plant material in addition to the seeds, the plurality of teeth 106 are configured to minimize the amount of plant material that is input into the harvester 100. The plurality of teeth 106 may be sized, spaced, and/or shaped to at least partially surround the head of the plant before stripping the seeds from the head of the plant and to minimize the amount of plant material (parts of the plant other than the seeds) that enters the harvester 100. This stripping action may help to minimize the amount of plant material that is stripped from the plant and input into the harvester 100. The plurality of teeth 106 may be very long and very narrow to enable the head of the plant to lodge in a throat 122 formed between two teeth 106 before the teeth 106 begin removing seeds from the plant head. The plant head may be surrounded by the teeth 106 before the seed removal begins. The plurality of teeth 106 may be further configured to point forward and away from the harvester 100 when they begin removing the seeds.

The plurality of teeth 106 may be aligned in a row and then attached to the axle 104 of the threshing drum 102. Multiple rows of the plurality of teeth 106 may be attached to the axle 104 of the threshing drum 102. The plurality of teeth 106 may be slightly angled towards the angle of rotation of the threshing drum 102. Angling the plurality of teeth 106 in the direction of rotation of the threshing drum 102 may help the plurality of teeth 106 to help cup the seeds and prevent them from falling out of the threshing drum 102 before reaching the screening assembly 108.

The plurality of teeth 106 may be configured differently depending on the type of crop being harvested. In addition, the plurality of teeth 106 may be configured to be easily removable from the threshing drum 102 in order to accommodate different crop types. For example, each row of the plurality of teeth 106 may be removable from the axle 104 of the threshing drum 102 and swapped out with different rows of plurality of teeth 106. Alternately, the axle 104 may be easily removed and may include different sets of plurality of teeth 106.

Each tooth 106 of the plurality of teeth 106 may be configured to be very long and narrow. The plurality of teeth may adopt a generally triangular shape. In one embodiment, the teeth may be configured to be ½ inch wide, 1½ inches long, and ⅛ inch thick. In another embodiment, the teeth may be even longer and narrower, having a length of approximately 2¼ inches. The forgoing dimensions are intended to be exemplary only and not intended to be limiting, and those having ordinary skill in the art will understand that additional dimensions and configurations of teeth are possible without departing from the scope of this disclosure.

Figure 5:
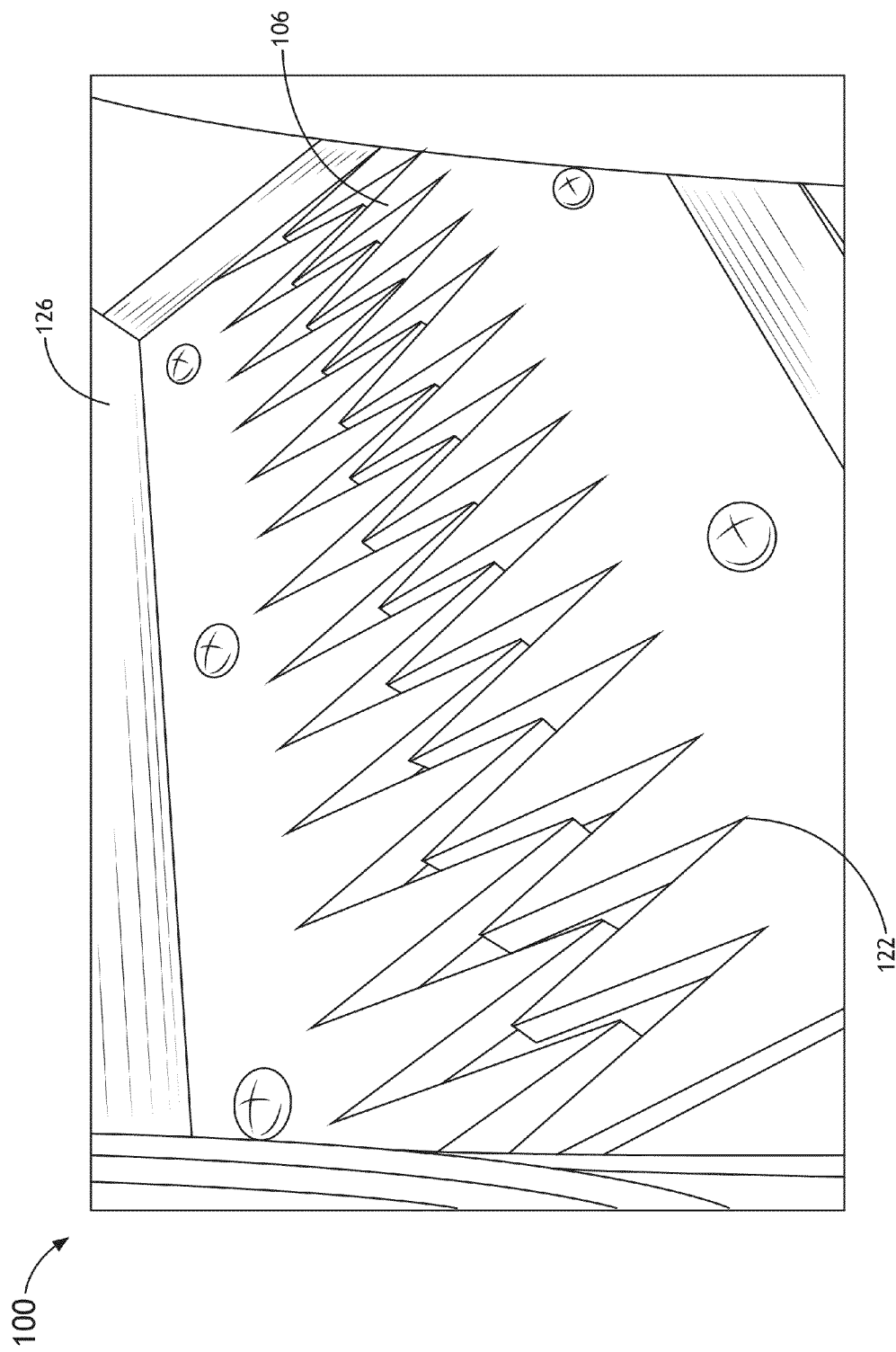
FIG. 5 is an illustration of a plurality of teeth associated with a handheld harvester.

The threshing drum 102 may further include a stationary set of teeth 124, as shown in FIG. 5. The stationary set of teeth 124 may be attached to a housing 126 that surrounds part of the threshing drum 102. The stationary set of teeth 124 may be configured to interleave with the plurality of teeth 106 as the plurality of teeth 106 rotate past the stationary set of teeth 124. When the plurality of teeth 106 pass through the stationary set of teeth 124, this may help to remove unwanted plant material from the plurality of teeth 106 and/or further separate the seeds from the plant material.

The harvester 100 further includes a screening assembly 108 coupled to the threshing drum 102. The screening assembly 108 includes an axle 110 and a plurality of paddles 112 coupled to the axle 110. The screening assembly 108 is configured to receive the seeds and any plant matter from the threshing drum 102 and to direct the seeds in a generally downward direction towards a screen 114, while ejecting at least some of the plant matter from the harvester 100.

The axle 110 of the screening assembly 108 may be configured to rotate. In one embodiment, the axle 110 of the screening assembly 108 is positioned to be generally perpendicular to the orientation of the axle 104 of the threshing drum 102. In addition, the screening assembly 108 may be controlled by the motor 118. The rotation speed of the screening assembly 108 may also be adjustable, depending on the type of crop and environmental conditions present during harvesting.

The screening assembly 108 may include a cover 128 that partially or completely surrounds the screening assembly 108. The screening assembly 108 may further include an outlet 130 that is configured to receive plant material and eject it from the harvester 100. The outlet 130 may be located towards the bottom and back side of the screening assembly 108 in one embodiment. Alternately, the outlet 130 may be located in any suitable location for ejecting plant material from the harvester 100. The outlet 130 may also be connected to a discharge spout in one embodiment to facilitate ejection of the plant material and movement away from the harvester 100.

The screening assembly 108 may be configured to operate simultaneously with the threshing drum 102. For example, the axle 104 of the threshing drum 102 may rotate and continuously thresh the seeds, while the screening assembly 108 may receive the seeds and plant material at the same time and further separate the seeds from the plant material.

The harvester 100 further includes the screen 114 in communication with the screening assembly 108. In one embodiment, the screen 114 may be coupled to a bottom side of the screening assembly 108. The screen 114 may be configured to receive the seeds from the screening assembly 108 and to allow seeds sized below a predetermined threshold (for example, a threshold corresponding to an aperture opening size in the screen 114) to pass through the screen 114. The screen 114 may also prevent plant material exceeding the predetermined threshold to pass through the screen 114.

The screen 114 may include a sheet with a plurality of apertures in the sheet. The sizing, pattern, number, and placement of the apertures may be designed to help facilitate passage of seeds through the screen 114 and the minimization of plant material passing through the screen. Similarly, the sizing, pattern, number, and placement of the apertures may vary depending on the crop type or environmental conditions.

The screen 114 may include a single screen in one embodiment, or multiple screens may be included. For example, in the embodiments shown in FIG. 2, a second screen 132, third screen 134, or fourth screen 136 may be included. The number of screens may vary depending on how clean the seeds and plant material are after they exit the screening assembly 108. If the seeds are generally separate from the plant material and very little plant material is present, fewer screens may be required. If more plant material or other non-seed material is included in the sample after it exits the screening assembly 108, then additional screens may be used. The number and placement of the screens may also vary depending on the crop type and environmental conditions. In addition, different types of screens may be included. For example, the screen 114 may have different aperture sizes than the second screen 132, and the second screen 132 may have different aperture sizes than the third screen 134, etc. Similarly, the screens may be configured to be easily removable so the harvester 100 may operate with fewer screens or a different screen type may be re-inserted. In one embodiment, the screens may be configured to slide out from the harvester 100 in a drawer-like manner.

The harvester 100 may further include a fan that may be attached to the harvester 100 in an area generally adjacent to the screening assembly 108 and/or the screen 114 and any additional screens. The fan may provide adjustable airflow across the screening assembly and the screen 114. The fan may help to facilitate the removal and ejection of plant material, while allowing seeds to remain within the harvester 100. The speed of the fan may be adjusted depending on operating conditions, environmental conditions, and the crop type.

The harvester 100 may further include a collection chamber 116 coupled to the screen 114 and the screening assembly 108. The collection chamber 116 may act as a hopper that is configured to receive the seeds from the screening assembly 108 after they have passed through the screen 114 and any additional screens. The seeds that are received in the collection chamber 116 may be clean and used for sampling. The collection chamber 116 may have a sloped bottom to facilitate movement of the seeds from the sides of the chamber 116 downwards. The collection chamber 116 may also be configured to channel seeds out of the collection chamber 116 and into a separate container. The collection chamber 116 may be configured to be easily removable from the harvester 100.

The collection chamber 116 may further include a scale for weighing the seeds in the collection chamber 116, or a moisture meter for determining a moisture level of the seeds in the collection chamber. The moisture meter and scale may be separate elements in one embodiment. In another embodiment, the moisture meter and the scale may be combined into a single apparatus. The harvester 100 may further include a Global Positioning System (GPS) that is configured to record location details. For example, the GPS may record details of where samples have been taken. In some embodiments, the harvester 100 may further include a computer processor configured to record sampling and other data, and to match this data with location data from the GPS.

The harvester 100 of the present disclosure may be small enough for handheld operation. For example, the harvester 100 may have a total weight and size that is low enough for a single person to operate it to harvest crops in a field.

The harvester 100 of the present disclosure may be suitable for taking samples at a variety of locations in a large field. Similarly, the harvester 100 may be suitable for harvesting small-scale crops, such as garden crops.

The harvester 100 may be suitable for a variety of grain types. For example, the harvester 100 may be used to harvest wheat, oats, barley, millet, or any other crop as may be desired.

Figure 6A:
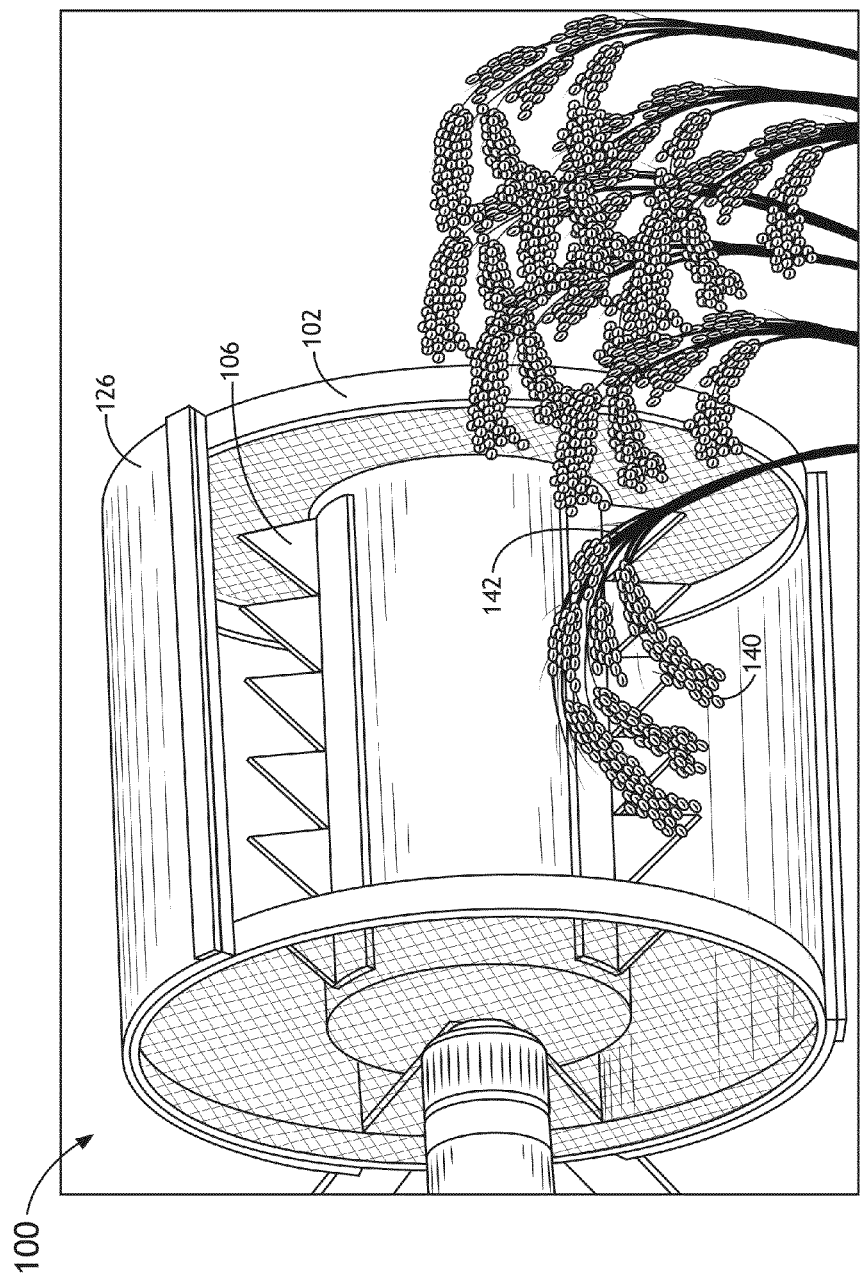
FIG. 6A is an example of a handheld harvester threshing seeds from a plant.
Figure 6B:
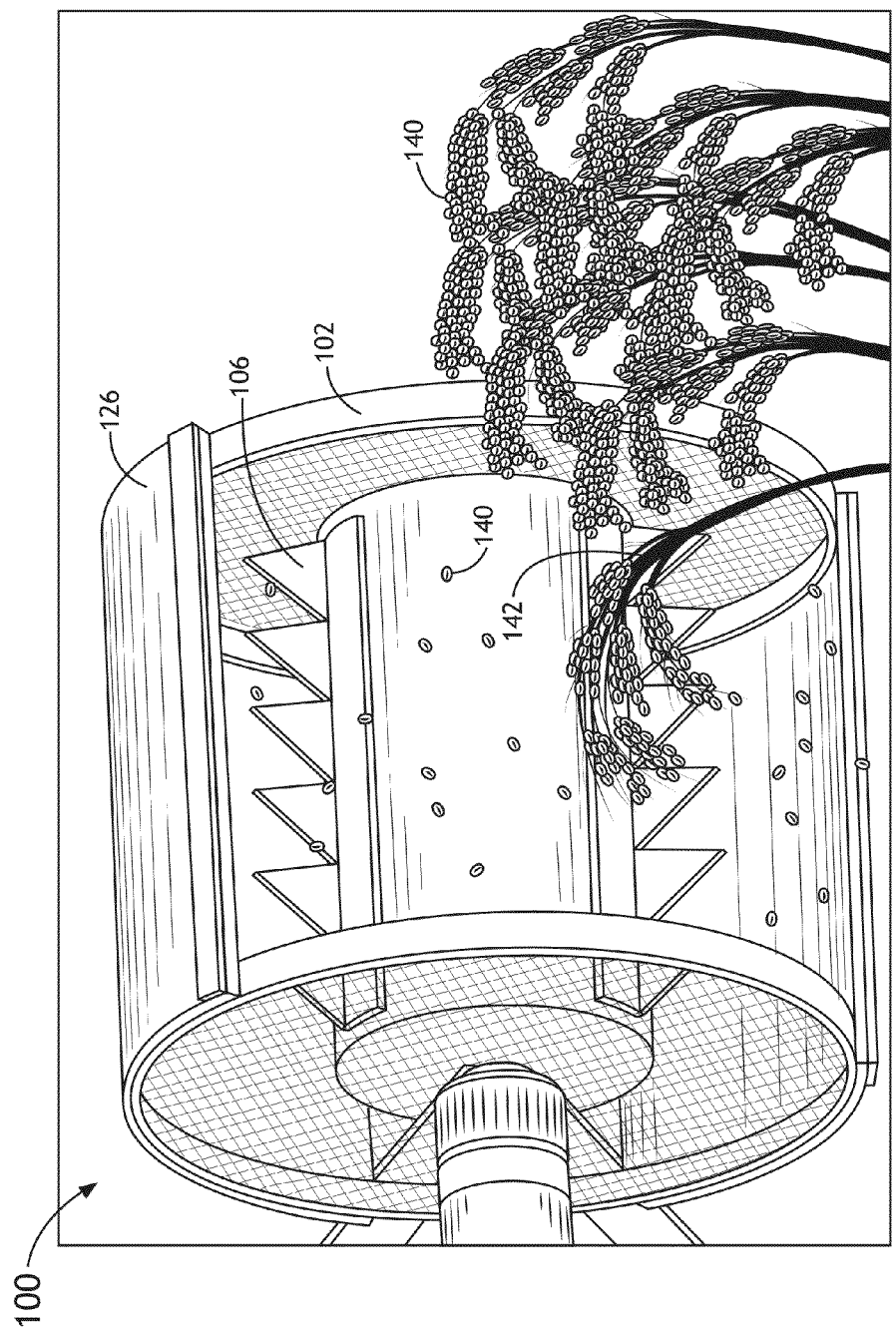
FIG. 6B is an example of a handheld harvester threshing seeds from a plant.
Figure 6C:
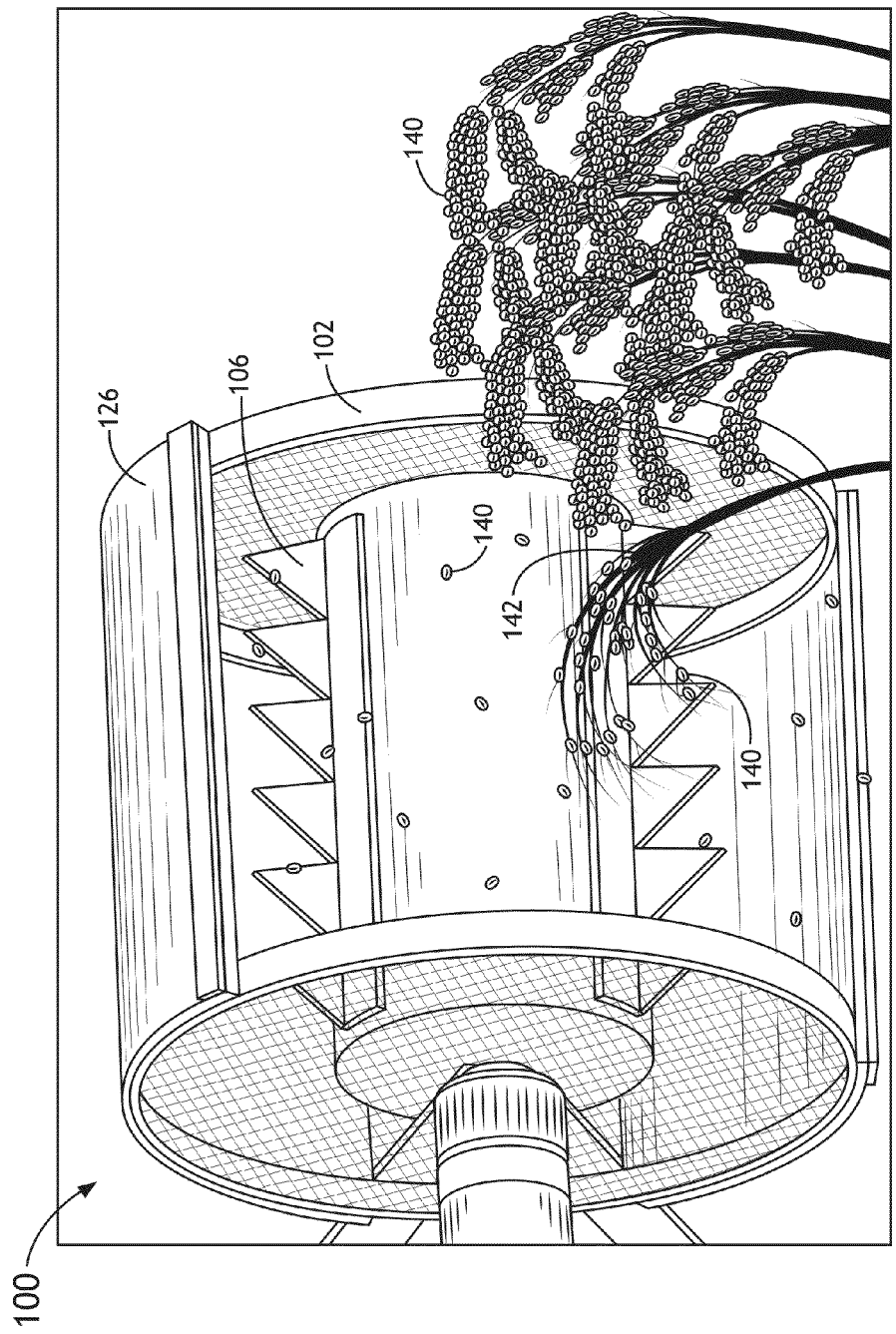
FIG. 6C is an example of a handheld harvester threshing seeds from a plant.

An example of the harvester 100 harvesting crops is provided in FIGS. 6A-6C. In FIG. 6A, the harvester 100 is just beginning to remove seeds 140 from the head 142 of the plant 144. In this initial stage, the seeds 140 are mostly intact on the head 142 of the plant 144 and have not been removed yet. In FIG. 6B, seed 140 removal has begun and the threshing drum 102 has begun to strip some of the seeds 140 from the head 142 of the plant 144 and to convey them into the harvester 100. In FIG. 6C, harvesting has continued and most of the seeds 140 on the plant 144 have been removed, while leaving the head 142 of the plant 144 mostly intact. While it is possible that some pieces of plant material from the plant 144 may also be removed during the harvesting process, the harvester 100 will effectively separate the plant material from the seeds 140 as the seeds 140 and any plant material pass through the harvester 100.

Figure 7:
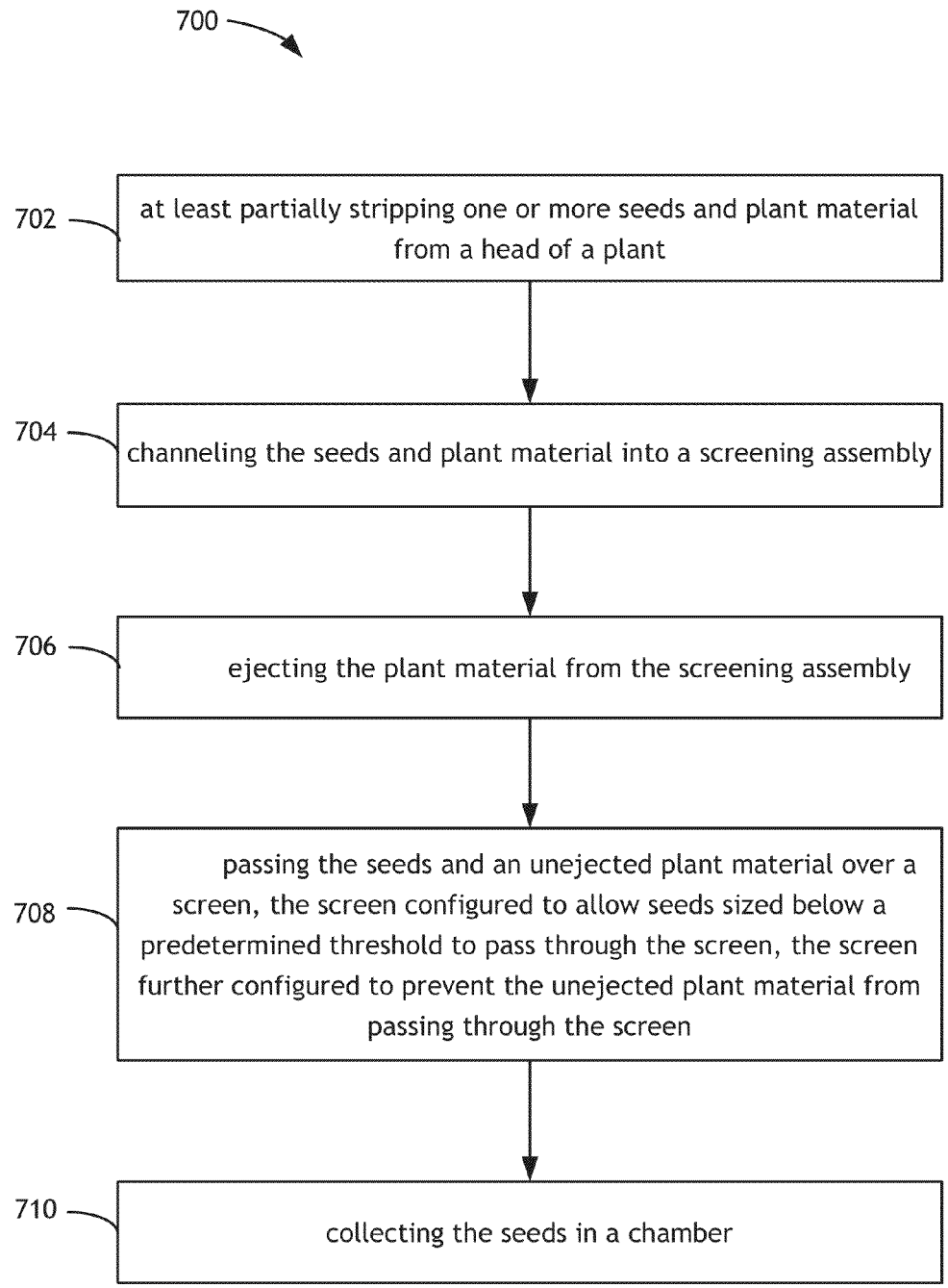
FIG. 7 is a method flow diagram of a method for harvesting.

The present disclosure is further directed to the method 700 of harvesting shown in FIG. 7. The method 700 may be performed by the harvester 100 of the present disclosure. The method 700 may include the step of at least partially stripping one or more seeds and plant material from a head of a plant 702. The method may further include the step of channeling the seeds and plant material into a screening assembly 704. The method 700 may also include the step of ejecting the plant material from the screening assembly 706. An additional step of the method 700 may include passing the seeds and an unejected plant material over a screen, the screen configured to allow seeds sized below a predetermined threshold to pass through the screen, the screen further configured to prevent the unejected plant material from passing through the screen 708. The method 700 may further include the step of collecting the seeds in a chamber 710.

The harvester of the present disclosure may provide several advantages. First, the harvester of the present disclosure may produce seed samples that are very clean and suitable for testing instrumentation. In addition, these samples may be produced quickly and on-site. Second, the harvester of the present disclosure may be configured to simultaneously eject unwanted plant material while the threshing drum is threshing. The resulting operation is highly efficient and allows harvesting to occur with limited or no down time due to removal of unwanted plant material from the harvester. Further, the continuous aspects of the harvester allow the operator to be relatively passive during harvesting, without the need to operate multiple components of the harvester. This also simplifies the learning curve for operators.

Third, the harvester is highly efficient at removing unwanted plant material and additional processing of the seeds may not be required after the screening step. For example, up to 90% of all unwanted plant material may be removed from the seed sample. Fourth, the harvester includes interchangeable components to accommodate different crop types. For example, the teeth may be interchangeable, as are the screens.

Fifth, the harvester may be easily adjusted and manipulated for efficient harvesting. For example, the harvester may be angled and adjusted during use by the operator to allow for more effective harvesting.

Sixth, the harvester may have a range of applications. For example, the harvester may be useful in obtaining grain samples for crops in a large field at several locations without the need for using heavy agricultural machinery. In addition, the harvester may be useful for harvesting crops for small operations, such as gardens.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

What is claimed is:

1. A harvester, comprising:
    a threshing drum, the threshing drum configured to rotate about a first axle;
    a plurality of teeth, the plurality of teeth connected to the threshing drum, the plurality of teeth configured to strip seeds from a head of a plant;
    a screening assembly in communication with the threshing drum, the screening assembly including a second axle and a plurality of paddles coupled to the second axle, the second axle being generally perpendicular to the first axle of the threshing drum, the screening assembly configured to receive seeds and plant material from the threshing drum, the screening assembly configured to eject the plant material though a side outlet of the screening assembly from the harvester and to direct the seeds downward;
    a first screen, the first screen in communication with the screening assembly and located below the screening assembly, the first screen configured to receive the seeds from the screening assembly, the first screen further configured to allow seeds sized below a predetermined threshold to pass through the first screen, the first screen configured to prevent plant material exceeding the predetermined threshold to pass through the first screen; and
    a collection chamber in communication with the first screen, the collection chamber configured to receive the seeds that pass through the first screen.

2. The harvester as claimed in claim 1, wherein the plurality of teeth are angled in a direction of rotation of the threshing drum.

3. The harvester as claimed in claim 1, further comprising:
    a second screen, the second screen positioned below the first screen, the second screen configured to receive seeds from the first screen, the second screen further configured to allow seeds sized below a predetermined threshold to pass through the second screen.

4. The harvester as claimed in claim 1, further comprising:
    a moisture meter, the moisture meter in communication with the collection chamber, the moisture meter configured to determine a moisture level of the seeds in the collection chamber.

5. The harvester as claimed in claim 1, wherein the harvester is configured to be portable and hand-held.

6. The harvester as claimed in claim 1, further comprising:
    a scale, the scale coupled to the collection chamber, the scale configured to determine a weight of the seeds in the collection chamber.

7. The harvester as claimed in claim 1, wherein the threshing drum is configured to operate simultaneously with the screening assembly.

8. The harvester as claimed in claim 1, wherein the threshing drum and the screening assembly are configured to operate continuously.

9. The harvester as claimed in claim 1, further comprising:
    a second set of teeth, the second set of teeth configured to interleave with the plurality of teeth, the second set of teeth configured to be stationary and to receive the plurality of teeth, a connection between the plurality of teeth and the second set of teeth configured to separate plant material from the seeds.

10. A handheld harvester, comprising:
    a threshing drum, the threshing drum configured to rotate about a first axle;
    a plurality of teeth, the plurality of teeth connected to the threshing drum, the plurality of teeth configured to at least partially surround a head of a plant before stripping one or more seeds from the head of the plant;
    a screening assembly in communication with the threshing drum, the screening assembly including a second axle and a plurality of paddles coupled to the second axle, the second axle being generally perpendicular to the first axle of the threshing drum, the screening assembly configured to receive seeds and plant material from the threshing drum, the screening assembly configured to eject the plant material though a side outlet of the screening assembly from the harvester and to direct the seeds downward;
    a plurality of screens, the plurality of screens in communication with the screening assembly and located below the screening assembly, the plurality of screens configured to receive the seeds from the screening assembly, the plurality of screens further configured to allow seeds sized below a predetermined threshold to pass through the plurality of screens, the plurality of screens configured to prevent plant material exceeding the predetermined threshold to pass through the plurality of screens; and
    a collection chamber in communication with the plurality of screens, the collection chamber configured to receive the seeds that pass through the plurality of screens, the collection chamber further including a scale and a moisture meter to determine a weight and a moisture level of the seeds.

* * * * *